(12) United States Patent
Schmidt et al.

(10) Patent No.: US 8,827,040 B2
(45) Date of Patent: Sep. 9, 2014

(54) SYSTEM FOR LUBRICATING A CLOSING MECHANISM, A CLOSING BAR AND CLOSING HOOK

(75) Inventors: Dirk Schmidt, Königstein (DE); José Algüera, Aschaffenburg (DE); Fan Zhang, Raunheim (DE); Heinz-Jürgen Seigis, Mömbris (DE); Wolfgang Pohl, Dreieich (DE)

(73) Assignee: Jost-Werke GmbH, Neu-Isenburg (DE)

( * ) Notice: Subject to any disclaimer, the term of this patent is extended or adjusted under 35 U.S.C. 154(b) by 1432 days.

(21) Appl. No.: 10/594,866

(22) PCT Filed: Mar. 22, 2005

(86) PCT No.: PCT/EP2005/003018
§ 371 (c)(1),
(2), (4) Date: Sep. 29, 2006

(87) PCT Pub. No.: WO2005/097584
PCT Pub. Date: Oct. 20, 2005

(65) Prior Publication Data
US 2007/0209879 A1    Sep. 13, 2007

(30) Foreign Application Priority Data

Apr. 1, 2004 (DE) .......................... 10 2004 016 005

(51) Int. Cl.
*B62D 53/08* (2006.01)
*F16N 21/00* (2006.01)

(52) U.S. Cl.
CPC ................................ *B62D 53/0885* (2013.01)
USPC ............................. 184/6.19; 280/433; 184/5

(58) Field of Classification Search
CPC .................................................. B62D 53/0885
USPC ................ 280/433–441.1; 184/6.19, 5, 105.1
See application file for complete search history.

(56) References Cited

U.S. PATENT DOCUMENTS 2,093,761 A * 9/1937 Kramer ......................... 280/441
2,738,988 A * 3/1956 Claussen et al. .............. 280/432
(Continued)

FOREIGN PATENT DOCUMENTS

DE           3530467 A1 *  3/1987
DE           4036484 A1    5/1992
(Continued)

OTHER PUBLICATIONS

Machine translation of DE 3530467 A1, Mar. 1987; <http://v3.espacenet.com/publicationDetails/biblio?CC=DE&NR=3530467A1&KC=A1&FT=D&date=19870305&DB=EPODOC&locale=en_EP>.*

(Continued)

*Primary Examiner* — Gene Crawford
*Assistant Examiner* — Terry Chau
(74) *Attorney, Agent, or Firm* — Hudak, Shunk & Farine Co. LPA

(57) ABSTRACT

The invention relates to a system for lubricating a closing mechanism on a saddle coupling comprising a closing mechanism which is arranged on the lower side of a coupling plate and which comprises at least one closing hook and/or closing bar, provided with a coating, and a fat reservoir which is connected to the closure hook by means of a lubricating line. The invention also relates to a coating of individual components of the system, i.e. the closing hook and the closing bar, in addition to the use of a coating. The invention is characterized in that the coating of the closing hook and/or the closing bar is embodied as a sliding coating.

22 Claims, 3 Drawing Sheets

(56) References Cited

U.S. PATENT DOCUMENTS

| | | | | |
|---|---|---|---|---|
| 2,960,352 A | * | 11/1960 | Wood | 280/433 |
| 3,000,653 A | * | 9/1961 | Wood | 280/433 |
| 3,743,054 A | * | 7/1973 | Jones, Jr. | 184/14 |
| 3,844,729 A | * | 10/1974 | Sedlatschek et al. | 428/560 |
| 4,477,100 A | * | 10/1984 | Elyakim | 280/434 |
| 4,572,537 A | * | 2/1986 | Hattori et al. | 280/433 |
| 5,417,308 A | * | 5/1995 | Hartl | 184/6.4 |
| 5,438,881 A | * | 8/1995 | Schedrat et al. | 73/862.57 |
| 5,968,325 A | * | 10/1999 | Oloman et al. | 204/230.5 |
| 6,802,394 B2 | * | 10/2004 | Patterson et al. | 184/45.1 |
| 6,874,599 B1 | * | 4/2005 | Riskedal | 184/105.3 |
| 2008/0185228 A1 | * | 8/2008 | Gallego et al. | 184/6.19 |

FOREIGN PATENT DOCUMENTS

| | | |
|---|---|---|
| DE | 4110893 A1 | 10/1992 |
| DE | 9401718 | 4/1994 |
| DE | 4304857 | 8/1994 |
| DE | 19624803 | 1/1998 |
| EP | 0507342 | 10/1992 |
| EP | 0994289 | 4/2000 |

OTHER PUBLICATIONS

Machine Translation for DE 43 04 857 A1.*
Machine Translation of DE 94 01 718.*
Human translation of DE 41 10 893.*
Human translation of DE 43 04 857.*

* cited by examiner

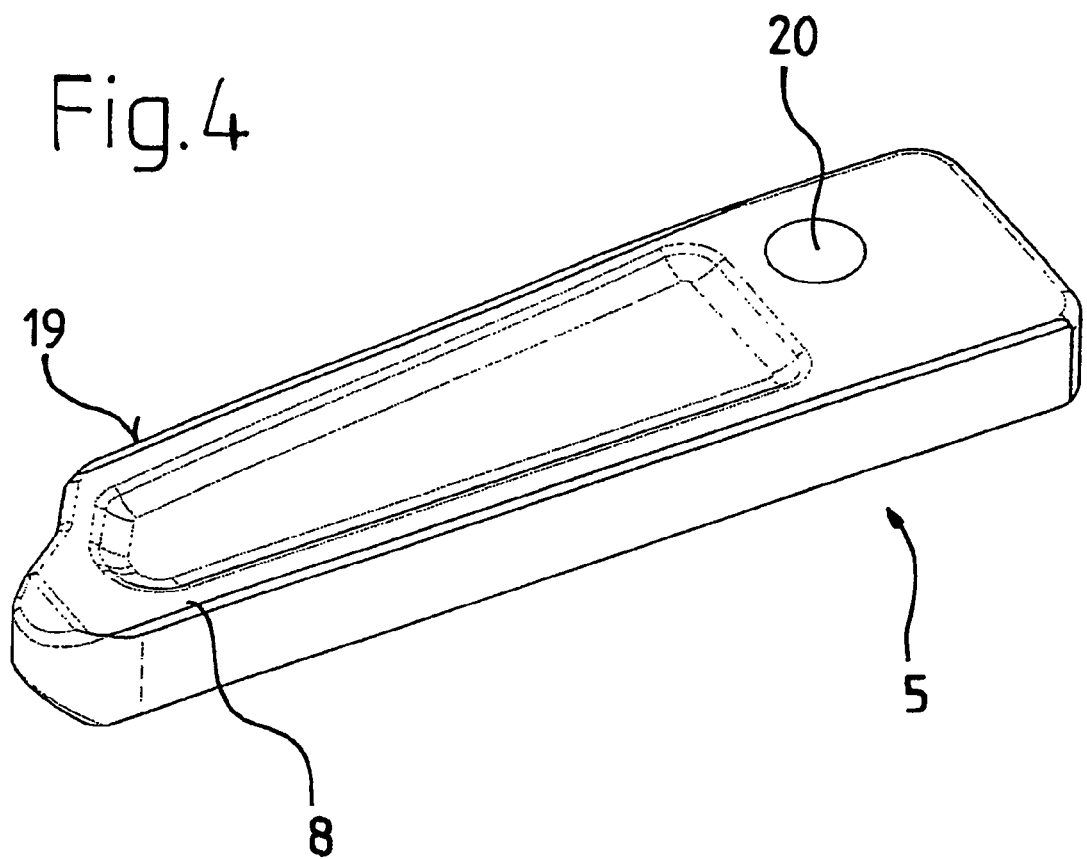

SYSTEM FOR LUBRICATING A CLOSING MECHANISM, A CLOSING BAR AND CLOSING HOOK

FIELD OF THE INVENTION

The invention pertains to a system for lubricating a closing mechanism on fifth wheels with a closing mechanism arranged on the bottom side of a coupling plate, having at least one closing hook and/or closing bar provided with a coating, and a grease reservoir, which is connected by a lubricating line to the closing hook. Furthermore, a coated closing hook and a closing bar, as well as the use of a coating to make closing hooks and bars, is patented.

BACKGROUND OF THE INVENTION

Fifth wheels couplings are usually mounted on tractor trucks and in the engaged condition they receive the kingpin of a trailer. After the trailer is coupled on, the closing mechanism of the fifth wheel is moved from an open, ready to use position to a closed position by means of a handle situated on the fifth wheel or also by means of a remote controlled drive unit from the driver's cabin. For this, a closing hook belonging to the closing mechanism usually embraces at least partly the kingpin introduced into the fifth wheel. Depending on the specific structural design of the fifth wheel, the closing hook and the kingpin can additionally be secured by a closing bar. When driving on the road, the closing hook in particular, with its contact surfaces at the kingpin and the closing bar, but also the closing bar with its contact surface at the closing hook, is subjected to extreme stresses in many respects.

The stresses are to a large extent produced by a relative movement between the kingpin and the frictional surfaces of the closing hook or the closing bar which make contact with it, in additional to further impact stresses, so that even after a short time both the kingpin and the closing hook will have their material worn away. The relative movement results from the steering movements of the tractor truck. This mechanical loading is further aggravated by corrosive influences, for example, those produced by contact with diesel fuel and unavoidable sand getting into the region of the closing mechanism.

The overwhelming majority of closing hooks are furnished with a coating by the manufacturer. This coating is a corrosion protection layer produced by a cathodic paint-dip method.

In order to minimize wear and tear, the problematical region of the frictional surfaces on the closing hook and/or closing bar is intensively lubricated with grease. This can be done manually by the driver, for example, or also automated via the central lubricating system of the tractor truck, if present. One such lubricating device is mentioned, for example, in DE 94 01 718 U1. One major component of this is a distribution block, arranged on the bottom side of the coupling plate, which is connected by a supply line to a central lubricant reservoir and from which a lubricating line runs to the closing hook, among other things. The lubricating of the closing hook occurs from the lubricant reservoir via the supply line through the distribution block and the lubricating line.

The major drawback of this lubrication system is the high grease consumption of several kilograms per year and the accompanying environmental pollution. Furthermore, solids build up in the excess grease, and during drive operation they are drawn in by a pump effect between kingpin and the frictional surfaces, where they bring about further intensification of the wear process.

For this reason, efforts have already been made to lower the grease consumption by coatings on the closing hook or kingpin. One such fifth wheel is described in DE 196 24 803 A1. The antifriction layer used there consists of a carbon-based layer, by which is meant pure carbon layers of diamondlike structure, metal-containing carbon layers or amorphous carbon layers, either pure or metal-containing. The major drawback of the known coating is its extremely great hardness as compared to the much more elastic material of the closing hook. In practice, this leads to an egg shell effect, that is, a two-dimensional chipping of the coating and a resulting high coefficient of friction, as well as a concomitant rapid destruction of the closing hook.

A different coating of the closing hook and the closing bar of a fifth wheel is disclosed by DE 43 04 857. The coating comprises a layer of hard material, sprayed onto the base material, and on top of that a sliding layer, which sliding layer contains a PTFE material. Furthermore, the thickness of the sliding layer is less than 50 µm and is dimensioned so that the sliding layer thinly covers the peaks of the layer of hard material and fills up the valleys lying between them.

However, a completely grease-free system has not worked out well in practice, since the wear on the components involved is too great under a constant loading.

Therefore, the basic problem of the invention is to improve a system for lubricating the closing mechanism and the individual components of which it is made so that the grease consumption under high operational availability is significantly and enduringly reduced, whether or not a central lubricating system is present.

SUMMARY OF THE INVENTION

The problem is solved according to the invention with a system in which the coating of the closing hook and/or closing bar is configured as a sliding coating and the grease reservoir is a grease cartridge, with the grease cartridge arranged on the fifth wheel.

By sliding coating is meant a coating that comprises preferably a hard component, e.g., a load-bearing layer, and a soft component, i.e., a layer softer in relation to the load-bearing layer. As the hard component, one may consider, for example, iron alloys, preferably with nickel or molybdenum components; as the soft component, PTFE, for example.

The grease cartridge is arranged on the fifth wheel, on the mounting plate or on the frame, especially preferably on the bottom side of the coupling plate. Thanks to the slight amount of grease needed, the grease cartridges can be built so small as to be mounted by means of clips in protected locations with no expense. After putting the grease cartridge in place, one need only arrange a lubricating line to the part being lubricated, preferably the closing hook.

Advantageously, the grease reservoir is a grease cartridge coordinated with the fifth wheel. The closing hook or closing bar provided with the sliding coating will now be supplied by the grease cartridge and the lubricating line with a definable extremely small amount of grease. The annually required amount of grease in the system of the invention is distinctly less than that in the systems currently in use.

Thanks to the slight amount of grease and the open choice of grease types made possible by the system, foreign particles can hardly get embedded in the grease, which further extends the lifetime of the particular structural parts. A further benefit of the system of the invention is the possibility of placing it in service as a stand-alone device, independent of the vehicle's technical equipment. The presence of a central lubricating system in the tractor truck is not necessary, and even a retrofitting for vehicles already in service can be done without great expense.

Advantageously, the grease cartridge has a drive unit. This can be, for example, an electromechanical drive, which basically comprises a gear motor and is powered by exchangeable batteries. The electromechanical drive units enable a precise supply of grease, largely independent of the prevailing outdoor temperature. Operating temperatures of −30° C. to 80° C. can be achieved. An automatic pressure control of preferably 5 bar can be integrated in the electromechanically operated grease cartridge, being preferably actuated by data from the vehicle's electronics.

Alternatively to the above-described embodiment with an electromechanical drive unit, a chemical drive unit can also be used. In the chemical drive unit, a piston is continuously advanced in the grease cartridge by formation of a gas and in this way it forces the grease out from the cartridge into the lubricating line connected to it. The liberation of the gas is commenced by tightening an activation screw in the grease cartridge. In this way, two different metals are introduced into an acid, such as citric acid, and form a galvanic cell, i.e., the less noble metal represents a negative pole and is progressively dissolved, while the more noble metal forms a positive pole, where hydrogen is given off. However, the quantity delivered is at least slightly dependent on the temperature and viscosity of the grease. The lower the temperature and thus the more viscous is the grease, the less the quantity of grease delivered. Even so, temperatures of −20° C. to 55° C. can be realized. With this chemical drive unit, a pressure of up to 4 bar can be built up. Thanks to the robust construction without external arrangement of electrical components, an operation under water is also possible without problem.

In one advantageous embodiment, the drive unit of the grease cartridge is connected to a variable control mechanism. In this way, one can influence the actual quantity of grease needed, so that for example during empty runs of the tractor truck with no trailer the grease supply can be shut off completely. In one favorable embodiment, the variable control mechanism has its own process computer, which can be programmed, for example, via an interface port. In this embodiment, one could enter characteristic curves specifying a larger or smaller need for grease depending on the season of the year.

The variable control mechanism can be configured, for example, as an engine control mechanism. The engine control mechanism operates the drive unit of the grease cartridge so that the desired quantity of grease is controlled directly, e.g., a start/stop function of the drive unit.

In order to control the quantity of grease independently by the drive unit, the variable control mechanism can also be configured as a valve control mechanism.

Especially preferably, the valve control mechanism comprises a flow limiting valve arranged in the lubricating line, while the flow limiting valve is connected to the valve control mechanism. Thus, in this case, no influence is exerted on the drive unit of the grease cartridge, but rather on a valve in the lubricating line to the closing hook. This can then be opened more or less to admit the desired quantity of grease.

In one special embodiment, the variable control mechanism communicates with a vehicle control mechanism. Through the vehicle control mechanism, all data measured in the vehicle can be marshaled, so that it can determine whether a trailer is present or measure the outdoor temperature to ascertain whether a correspondingly larger quantity of grease can be supplied. A supply of grease could also occur when the engine of the tractor truck is running.

Alternatively to the data link to the vehicle control mechanism, the variable control mechanism could also be hooked up to a coupling control mechanism in order to receive data. Coupling control mechanisms are a frequent feature of remote controlled fifth wheels and they enable an automated coupling and uncoupling of the trailer.

For this, the coupling control mechanisms are connected to a sensor system, by which the presence of a trailer can be detected, especially by sensing the kingpin of a trailer. Thus, by picking off the data of the coupling control mechanism, it is also possible to control the quantity of grease through the engine control mechanism or valve control mechanism.

In the event that no coupling control mechanism is present, the variable control mechanism can also be connected to a pressure sensor arranged on the coupling plate. When a trailer is present, a pressure is exerted on the coupling plate and detected by the pressure sensor. This metered value is evaluated by the variable control mechanism and used to determine the amount of grease to be dispensed.

An important individual component here is the closing hook, whose coating is configured as a sliding coating according to the invention.

The solution of the problem also involves improvement in the individual components built into the system. A major individual component is the closing hook, whose coating is configured as a sliding coating according to the invention. It has proven advantageous to have the sliding coating consist of a multilayer system.

The multilayer system, in turn, is preferably composed of at least a first layer, which comprises an iron alloy with nickel and molybdenum fractions, and a second layer of PTFE, applied to the first layer.

Before applying the sliding coating of the invention, the surface of the part being coated is cleaned with a blasting of aluminum oxide. Next, a matrix of nickel-iron-molybdenum is created and the PTFE is embedded in the coated surface as dry lubricant.

The sliding coating can withstand very high and very low temperatures without damage. The hardness of the surface is doubled thanks to the sliding coating. The coefficient of friction when interacting with the conventional kingpins is 0.14 to 0.18.

Another suitable material is an aluminum sliding coating with titanium and chromium fractions.

According to one special embodiment, the sliding coating is made from a multistage thermal spray layer. This has the benefit that no temperature influence is required, as might weaken the closing hook. The closing hook is usually thermally hardened and a temperature treatment during the coating process would then result in eliminating or negatively influencing the hardness, which in turn would lead to brittleness of the closing hook and considerably increase the loading and the danger of fracture.

Advantageously, the sliding coating has a layer thickness of 50 µm to 150 µm, especially preferably 70 µm to 130 µm, most preferably 76 µm to 127 µm.

A second major individual component is the closing bar, which should likewise be provided with a coating in the form of a sliding coating. Of special interest in regard to wear is the contact surface to the closing hook and to the kingpin, so that it would theoretically be enough to provide only the strained surfaces with the sliding coating. But in terms of manufacturing layout, this is often more costly than coating the entire component.

Furthermore, the patent covers the use of a sliding coating for the making of a closing hook or closing bar and the use of a closing hook or closing bar provided with a sliding coating to make a fifth wheel. The sliding coatings in question will have the features described above.

BRIEF DESCRIPTION OF THE DRAWINGS

The invention will now be explained more closely by means of the four drawing figures:

FIG. 4: a three-dimensional view of a closing bar.

DETAILED DESCRIPTION OF THE INVENTION

Figure 1:
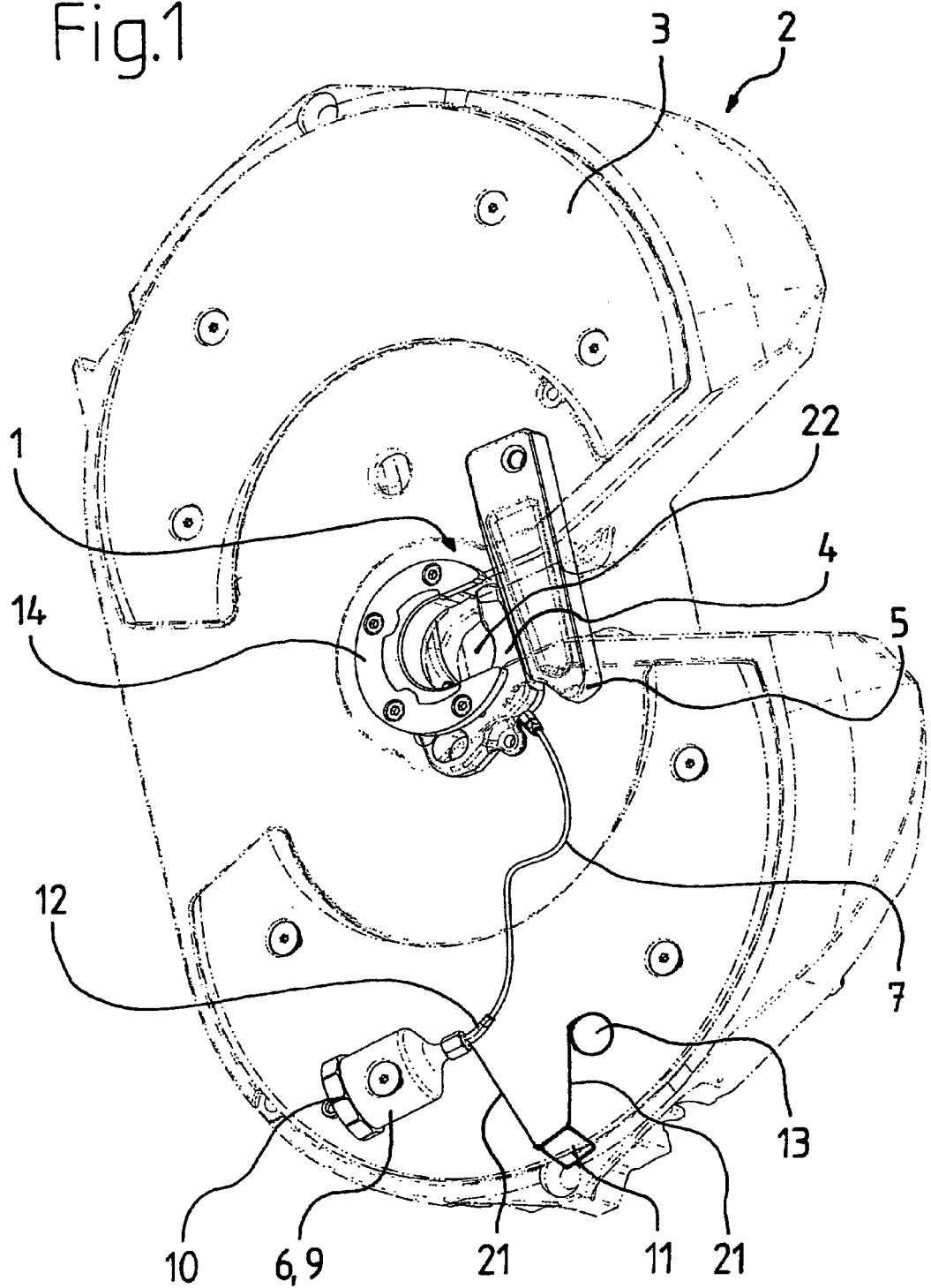
FIG. 1: a three-dimensional schematic representation of a fifth wheel with closing hook, closing bar, and grease cartridge arranged thereon.

FIG. 1 shows schematically in a three-dimensional view a fifth wheel 2 with a coupling plate 3 and a closing mechanism 1, not actually visible in a real coupling plate 3 from this perspective, engaging at the bottom side of the coupling plate 3. At the center of the coupling plate 3 is the bearing opening 22 to receive the kingpin (not shown) of a trailer. The bearing opening 22 is surrounded by the closing ring 14 in the manner of a half shell. The closing ring 14 is made from a high impact-resistant plastic material and can be easily replaced after reaching its maximum wear.

The closing mechanism 1 basically comprises the closing hook 4 and the closing bar 5, which lies against the closing hook 4 in the closed position shown. The closing bar 5 in the closed position prevents the closing hook 4 from swing back into an open position, designed to receive the kingpin.

The closing hook 4 is connected directly to the lubricating line 7. For the best possible distribution of the grease on the contact surface 15 (see FIG. 2) of the closing hook 4 at the kingpin (not shown) that is most subjected to friction, the closing hook 4 has a lubricating channel 23 running in the radial direction.

The end of the lubricating line 7 away from the closing hook 4 is connected to a valve control mechanism 12, which in turn engages directly with the grease reservoir 6. The grease reservoir 6 is configured as a grease cartridge 9 and holds a quantity of grease for a period of 2 to 3 years. In the representation shown, the grease cartridge 9 is provided with a drive unit 10 for pushing out the grease, the drive unit 10 being configured as a chemical drive, that is, the pressure buildup needed to expel the grease comes from a continuing chemical reaction.

A controlled and influenceable dispensing of grease, which would not be possible solely with a chemical drive 10 for the grease cartridge 9, is possible thanks to the valve control mechanism 12. The essential component of the valve control mechanism 12 is a shutoff valve, which is actuated by the variable control mechanism 11 via data cables 21 and can be switched between a closed position and an open position.

The control mechanism 11 is a process computer, which is likewise hooked up via data cables 21 to a pressure sensor 13. When the trailer is mounted, it exerts a load on the fifth wheel 2. This load status is sensed by the pressure sensor 13, goes as a metered value into the variable control mechanism 11 and is processed there. As a result, the variable control mechanism 11 when a trailer is present puts out a control signal at its data output to open the valve control mechanism 12. When a trailer is not mounted, on the other hand, the valve control mechanism 12 is placed in a closed position, so that no grease gets out of the grease cartridge 9. Thanks to this procedure, the grease consumption is even further reduced.

The grease used serves to lessen the friction and wear. Preferably, it is a lithium-saponified grease with a base oil mixture and additives to optimize the general lubricant properties, such as corrosion and aging protection, lubricating film strength, and high and low temperature behavior. The duty temperature can lie between −35° C. and 150° C.

Figure 2:
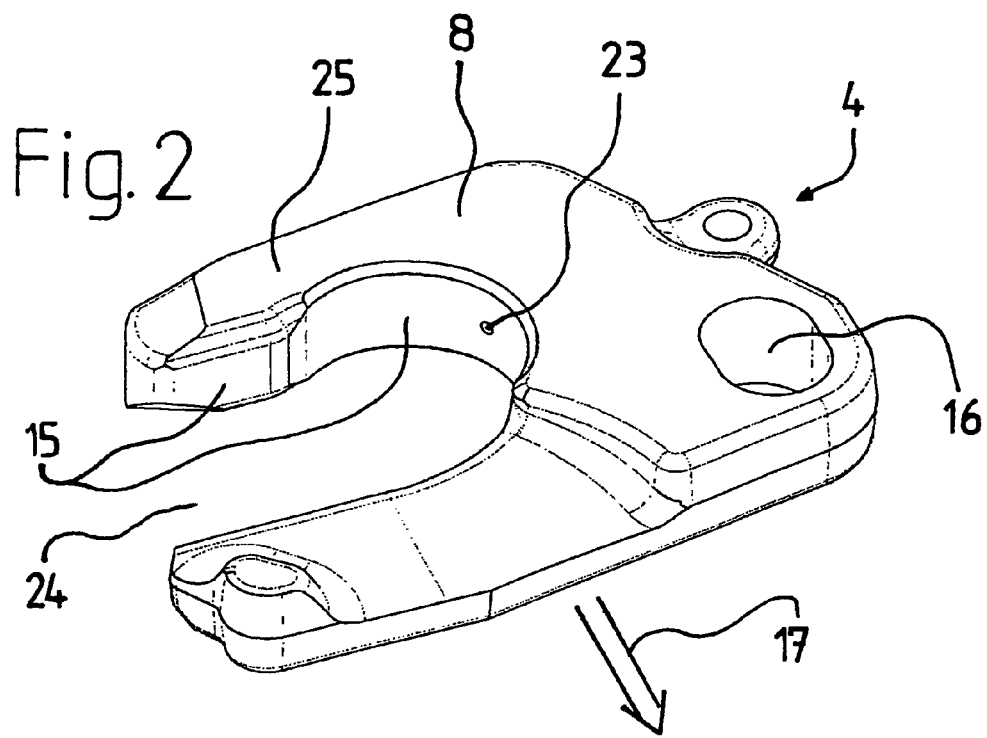
FIG. 2: a three-dimensional view of a closing hook looking opposite the direction of travel.

FIG. 2 shows the closing hook 4 in perspective, opposite the driving direction 17. The closing hook 4 can swivel about the bearing hole 16 in the installed condition. The bearing hole 16 and the lubricating channel 23 are arranged on one side of the closing hook 4 opposite the closing opening 24. In this region, the closing hook 4 is rather slightly mechanically loaded, so that a weakening of the structural part can be accepted.

Likewise in FIG. 2 one notices on the rear leg 25 of the closing hook 4 the contact surfaces 15, i.e., the contact region with the kingpin (not shown) lying at the inner side. In this region and the region of the outer contact surface 18 (see FIG. 3), a selective coating with the sliding coating 8 of the invention would be sufficient. But for manufacturing reasons, it is easier and therefore also cheaper to provide the entire closing hook with the sliding coating 8. This also holds for the closing bar.

Figure 3:
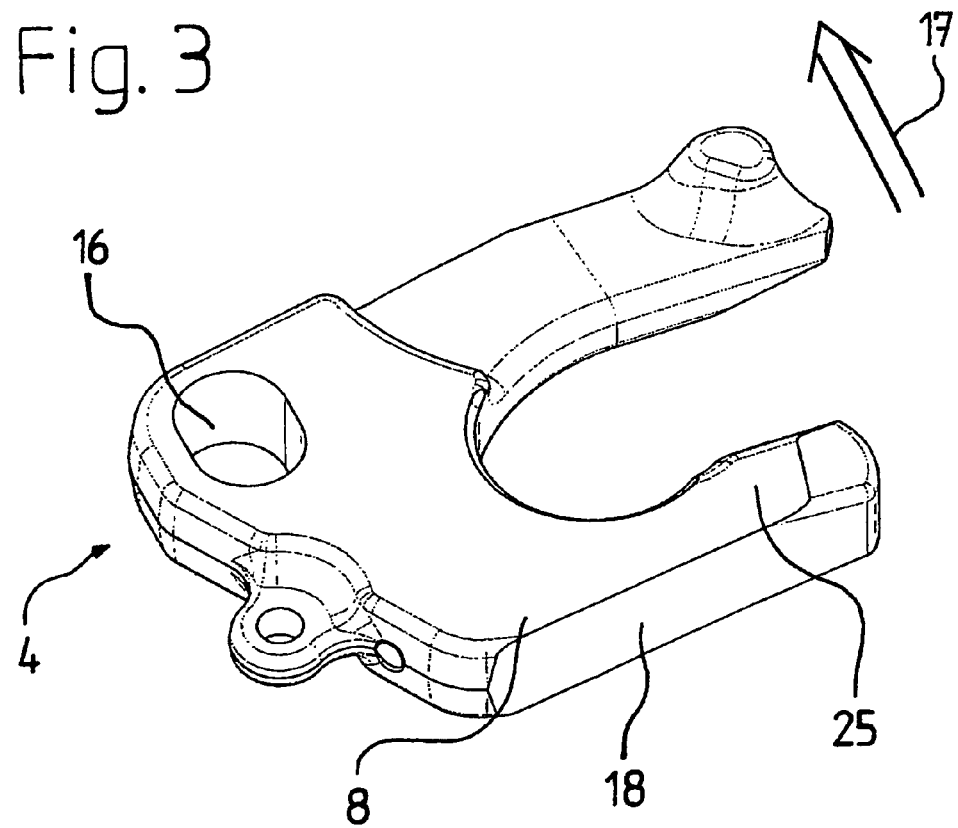
FIG. 3: a three-dimensional view of a closing hook looking in the direction of travel.

FIG. 3 shows the closing hook corresponding to FIG. 2, locking in the direction of driving 17. On the outside of the rear leg 25 is the contact surface 18 to bear the closing bar 5 shown perspectively in FIG. 4. The complementary configured contact surface of the closing bar 5 to the closing hook 4 is designated as contact surface 19.

The closing bar 5 is also completely jacketed in the sliding coating 8.

The closing bar 5 is mounted in the bearing hole 20 and can be pulled out to the side in order to release the closing hook 4.

List of Reference Numbers

1 closing mechanism
2 fifth wheel
3 coupling plate
4 closing hook
5 closing bar
6 grease reservoir
7 lubricating line
8 sliding coating
9 grease cartridge
10 drive unit
11 variable control mechanism
12 valve control mechanism
13 pressure sensor
14 wearing ring
15 contact surface of closing hook and kingpin
16 bearing hole of closing hook
17 direction of driving
18 contact surface of closing hook and closing bar
19 contact surface of closing bar and closing hook
20 bearing hole of closing bar
21 data cable
22 bearing opening
23 lubricating channel
24 closing opening
25 rear leg of closing hook

The invention claimed is:

1. A system for lubricating a closing mechanism on a fifth wheel comprising: the closing mechanism arranged on a bottom side of a coupling plate, the closing mechanism having at least one closing hook provided with a permanent coating, and a grease reservoir having only one lubricating line exiting the grease reservoir, wherein the lubricating line is solely connected to the closing hook such that grease is distributable from the lubricating line directly onto a contact surface of the closing hook which contacts a kingpin when the kingpin is present, wherein the coating of the closing hook is configured as a sliding coating and the grease reservoir is a grease cartridge, with the grease cartridge arranged on the fifth wheel.

2. The system per claim 1, wherein the grease cartridge is coordinated with the fifth wheel.

3. The system per claim 2, wherein the grease cartridge is arranged underneath the coupling plate and has a drive unit that comprises an electromechanical drive or a chemical drive, wherein the drive unit is connected to a variable control mechanism that interacts with a valve control mechanism, or a flow restriction valve arranged in the lubricating line, wherein the variable control mechanism communicates with a control unit, or with a pressure sensor arranged on the coupling plate.

4. The system per claim 1, wherein the grease cartridge is arranged underneath the coupling plate.

5. The system per claim 1, wherein the grease cartridge has a drive unit.

6. The system per claim 5, wherein the drive unit comprises an electromechanical drive.

7. The system per claim 5, wherein the drive unit comprises a chemical drive.

8. The system per claim 5, wherein the drive unit is connected to a variable control mechanism.

9. The system per claim 8, wherein the variable control mechanism interacts with a valve control mechanism.

10. The system per claim 9, wherein the valve control mechanism comprises a flow restriction valve arranged in the lubricating line.

11. The system per claim 8, wherein the variable control mechanism communicates with a vehicle control unit.

12. The system per claim 8, wherein the variable control mechanism communicates with a coupling control unit.

13. The system per claim 8, wherein the variable control mechanism communicates with a pressure sensor arranged on the coupling plate.

14. The system per claim 1, wherein at least one outer surface of the closing hook is provided with the coating, wherein the coating is in the form of the sliding coating.

15. The system per claim 14, wherein the sliding coating consists of a multilayer system.

16. The system per claim 15, wherein the multilayer system is composed of at least a first layer, which comprises an iron alloy with nickel and molybdenum fractions, and a second layer of PTFE, applied to the first layer.

17. The system per claim 14, wherein the sliding coating has a layer thickness of 50 to 150 µm.

18. The system per claim 17, wherein the sliding coating has a layer thickness of 70 to 130 µm.

19. The system per claim 1, including a closing bar for use in the fifth wheel, wherein at least one outer surface of the closing bar is provided with the coating, wherein the coating is in the form of the sliding coating.

20. A system for lubricating a closing mechanism on a fifth wheel comprising: the closing mechanism arranged on a bottom side of a coupling plate, the closing mechanism having at least one closing hook provided with a permanent coating, and a grease reservoir having only one lubricating line exiting the grease reservoir, wherein the lubricating line is solely connected to the closing hook, wherein the coating of the closing hook is configured as a sliding coating, wherein the grease reservoir is a grease cartridge, with the grease cartridge arranged on the fifth wheel, and wherein the closing hook comprises a lubricating channel expiring on a contact surface which contacts a kingpin when the kingpin is present.

21. A system for lubricating a closing mechanism on a fifth wheel comprising: the closing mechanism arranged on a bottom side of a coupling plate, the closing mechanism having at least one closing hook provided with a permanent coating, and a grease reservoir having only one lubricating line exiting the grease reservoir, wherein the lubricating line is solely connected to the closing hook, wherein the coating of the closing hook is configured as a sliding coating, wherein the grease reservoir is a grease cartridge, with the grease cartridge arranged on the fifth wheel, and wherein the closing hook comprises a lubricating channel running in a radial direction and expiring on a contact surface which contacts a kingpin when the kingpin is present.

22. A system for lubricating a closing mechanism on a fifth wheel comprising: the closing mechanism arranged on a bottom side of a coupling plate, the closing mechanism having at least one closing hook provided with a permanent coating, and a grease reservoir having only one lubricating line exiting the grease reservoir wherein the lubricating line is solely connected to the closing hook, wherein the coating of the closing hook is configured as a sliding coating and the grease reservoir is a grease cartridge, with the grease cartridge arranged on the fifth wheel, and wherein the closing hook comprises a lubricating channel running in a radial direction on one side of the closing hook opposite a closing opening.

* * * * *